US008091065B2

(12) United States Patent
Mir et al.

(10) Patent No.: US 8,091,065 B2
(45) Date of Patent: Jan. 3, 2012

(54) THREAT ANALYSIS AND MODELING DURING A SOFTWARE DEVELOPMENT LIFECYCLE OF A SOFTWARE APPLICATION

(75) Inventors: Talhah Munawar Mir, Redmond, WA (US); Anil Kumar Venkata Revuru, Bellevue, WA (US); Deepak J. Manohar, Redmond, WA (US); Vineet Batta, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1134 days.

(21) Appl. No.: 11/860,900

(22) Filed: Sep. 25, 2007

(65) Prior Publication Data

US 2009/0083695 A1 Mar. 26, 2009

(51) Int. Cl.
*G06F 9/44* (2006.01)
*G06F 9/45* (2006.01)

(52) U.S. Cl. ........................... 717/104; 717/107; 726/22

(58) Field of Classification Search .......... 717/101–109, 717/120–123; 726/22–25

See application file for complete search history.

(56) References Cited

U.S. PATENT DOCUMENTS

| | | | | |
|---|---|---|---|---|
| 6,002,867 | A * | 12/1999 | Jazdzewski | 717/105 |
| 6,263,492 | B1 * | 7/2001 | Fraley et al. | 717/107 |
| 6,662,357 | B1 * | 12/2003 | Bowman-Amuah | 717/120 |
| 6,968,536 | B2 * | 11/2005 | Jazdzewski | 717/106 |
| 7,058,822 | B2 * | 6/2006 | Edery et al. | 726/22 |
| 7,191,429 | B2 * | 3/2007 | Brassard et al. | 717/104 |
| 7,209,037 | B2 * | 4/2007 | Webb, Sr. | 340/539.13 |
| 7,213,146 | B2 | 5/2007 | Stehlin | |
| 7,243,374 | B2 | 7/2007 | Howard et al. | |
| 7,284,274 | B1 * | 10/2007 | Walls et al. | 726/25 |
| 7,424,742 | B1 * | 9/2008 | Dash et al. | 726/22 |
| 7,451,403 | B1 * | 11/2008 | Srinivasan et al. | 715/763 |
| 7,502,939 | B2 * | 3/2009 | Radatti | 713/188 |
| 7,509,677 | B2 * | 3/2009 | Saurabh et al. | 726/23 |
| 7,571,483 | B1 * | 8/2009 | Bascle et al. | 726/24 |
| 7,581,103 | B2 * | 8/2009 | Home et al. | 713/176 |
| 7,640,587 | B2 * | 12/2009 | Fox et al. | 726/24 |
| 7,644,438 | B1 * | 1/2010 | Dash et al. | 726/22 |
| 7,765,410 | B2 * | 7/2010 | Costea et al. | 713/188 |
| 7,788,638 | B2 * | 8/2010 | Hoberman et al. | 717/120 |
| 7,797,549 | B2 * | 9/2010 | Main et al. | 713/186 |
| 7,818,788 | B2 * | 10/2010 | Meier | 726/4 |
| 7,818,797 | B1 * | 10/2010 | Fan et al. | 726/22 |
| 7,949,992 | B2 * | 5/2011 | Andreev et al. | 717/104 |
| 2003/0140249 | A1 | 7/2003 | Taninaka et al. | |
| 2004/0044912 | A1 | 3/2004 | Connary et al. | |
| 2004/0153171 | A1 | 8/2004 | Brandt et al. | |

(Continued)

OTHER PUBLICATIONS

Sultan et al, "Catalog of metrics for assessing security risks of software throughout the software development life cycle", IEEE, pp. 461-465, 2008.*

(Continued)

*Primary Examiner* — Anil Khatri

(74) *Attorney, Agent, or Firm* — Lee & Hayes, PLLC

(57) ABSTRACT

Systems and methods relating to a method for generating a threat analysis and modeling tool are described. In an implementation, aggregate analysis is performed upon applications of an enterprise for complete risk management of the enterprise. The threat analysis model is generated by defining the application, its attributes and the rules related to the application. An application task list is generated from a common task list for the application. Countermeasures for known attacks pertaining to the application are described in the application task list, which allows the developer to reduce the risk of attacks.

18 Claims, 9 Drawing Sheets

U.S. PATENT DOCUMENTS

| | | | |
|---|---|---|---|
| 2006/0101514 A1 | 5/2006 | Milener et al. |
| 2006/0156408 A1 | 7/2006 | Himberger et al. |
| 2007/0016955 A1 | 1/2007 | Goldberg et al. |
| 2007/0113281 A1 | 5/2007 | Leach |
| 2007/0157311 A1 | 7/2007 | Meier et al. |

OTHER PUBLICATIONS

Gotterbarn, "Enchancing risk analysis using software development impact statements", IEEE, 43-51, 2001.*

Hui et al, "A bayesian belief network model and tool to evaluate risk and impact in software development projects", IEEE, pp. 297-301, 2004.*

Futcher et al, "Guidelines for secure software development", ACM SAICIST, pp. 56-65, 2008.*

Kocher et al, "Security as a new dimension in embedded system design", ACM DAC, pp. 753-760, 2004.*

Smuts et al, "Critical success factors for information systems outsourcing management: a softwre development lifecycle view", ACM SAICSIT, pp. 304-313, 2010.*

Cock, et al., "Threat Modelling for Security Tokens in Web Applications", available at leaset as early as Jul. 26, 2007, at <<http://sec.cs.kent.ac.uk/cms2004/Program/CMS2004final/p4a6.pdf>>, pp. 183-193.

Oladimeji, et al., "Security Threat Modeling and Analysis: A Goal-Oriented Approach", available at least as early as Jul. 26, 2007, at <<http://www.utd.edu/~eao015100/documents/SecurityThreatModeling.pdf>>, pp. 8.

Pauli, et al., "Threat-Driven Architectural Design of Secure Information Systems", available at least as early as Jul. 26, 2007, at <<http://cs.ndsu.edu/~dxu/publications/pauli-xu-ICEIS05.pdf>>, pp. 8.

* cited by examiner

400

<table>
<tr><th>Qualifier Attribute Category</th><th>Qualifier Attribute</th><th>Qualifier Attribute</th><th>Threat Configuration Rule</th><th>CTL Binding Rule</th></tr>
<tr><td>Component</td><td>Type</td><td>Website <u>402</u></td><td rowspan="2">Confidentiality:<br>Risk Impact: High<br>Risk Response: Reduce</td><td rowspan="3">TI_ID 57 (SSL) <u>406</u></td></tr>
<tr><td>Component</td><td>Type</td><td>Web Service <u>404</u></td></tr>
<tr><td>Data</td><td>Data Classification</td><td>HBI</td><td>Integrity:<br>Risk Impact: Medium<br>Risk Response: Reduce</td></tr>
</table>

Fig. 4

THREAT ANALYSIS AND MODELING DURING A SOFTWARE DEVELOPMENT LIFECYCLE OF A SOFTWARE APPLICATION

BACKGROUND

The use of computer-based networks (e.g., Internet based networks), provides information readily available to many users. Such networks can host multiple applications; however, the applications may be subject to security related attacks. Security related attacks have led to increased security measures to protect the information stored in or displayed on these applications. Protected information can include customer's banking information, social security numbers, email passwords, financial reports of organizations, etc.

Typically, the security aspect of an application comes after the software development lifecycle and is not an inherent part of the software development cycle itself. For such network based applications, security aspects are generally implemented at a later stage. This may result in an inadequate capability to handle various other security threats.

Security of such applications can be implemented by envisioning a threat model that simulates the threat that an application may be subjected to; however, existing threat models art typically realized for single applications and not the entire collection of applications (e.g., programs in a business enterprise). The typical threat management process is a manual process, which involves understanding and maintaining application security on par with the enterprise level security.

SUMMARY

This summary is provided to introduce concepts relating to enterprise threat analysis and modeling for applications. These concepts are further described below in the detailed description. The presented summary is not intended to identify essential features of the claimed subject matter, nor is it intended for use in determining the scope of the claimed subject matter.

In an embodiment, attributes, objectives, and functionality of a software application are identified. The software application is designed and code written for the software application based on a threat model that accounts for the attributes, objectives, and functionality.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4 illustrates an exemplary table of rules applied to an application.

DETAILED DESCRIPTION

Figure 1:
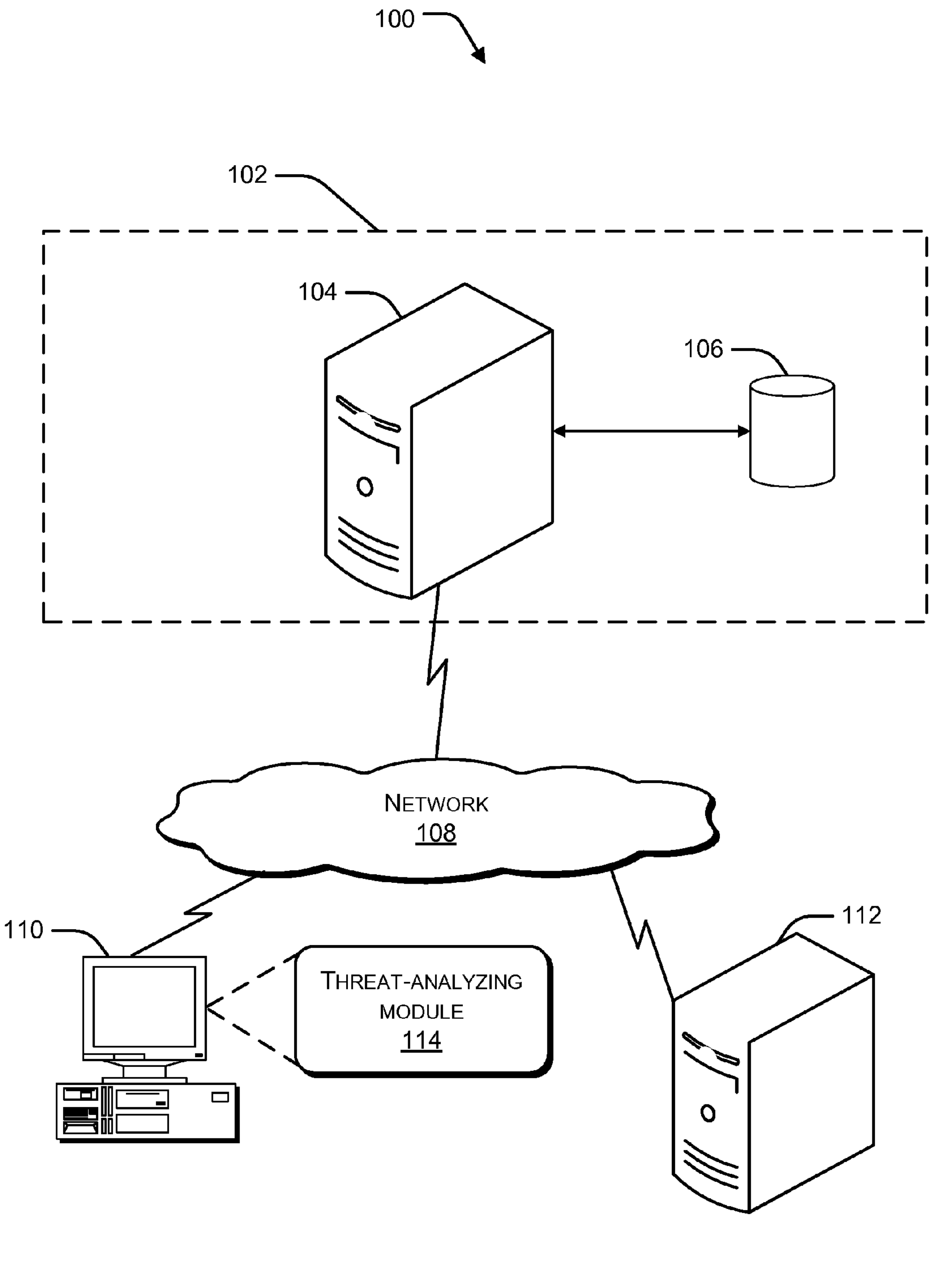
FIG. 1 illustrates an exemplary architecture for implementing a threat model for threat analysis and modeling.

Typically, applications are developed without taking into consideration various threats that the application may be subjected to. This arises due to inadequate or incomplete identification of the various threats that the application may face. Threats to an application are identified in order to classify the threats and further secure the application against these threats.

Threats to an application can include conditions that result in an unpredictable behavior of the application. Such threats can be software attacks, such as attacks through a malicious code. Threats can also include physical/mechanical failures like fires, water damage, and mechanical breakdowns. Threat analysis and modeling can be employed to describe a given threat and predict the harm it could inflict upon a vulnerable application. In addition, threat analysis and modeling can be employed to provide countermeasures against predicted attacks, and detailed methods to implement the countermeasures to remove the vulnerabilities of the applications.

Threat analysis and modeling can include defining a cost effective risk mitigation policy for a specific architecture, functionality, and configuration. Threat analysis and modeling can also involve mapping of assets, modeling of threats and building of a mitigation plan that lowers system risk to an acceptable level. The mitigation plan can include one or more countermeasures that can be effective against the identified threats.

Typically, threat analysis and modeling involves identifying one or more threats. Generally, each of the threats is mapped on to the attributes associated with elements of an application. The threats and the attributes associated with the elements of the application can be stored and various conditions can be identified as threats based on these attributes. For example, in an application that deals with data elements that include personally identifiable data (PII), PII could be one of the application's attributes and the possible threats to this kind of data could be confidentiality and integrity threats.

To this end, a system implements threat analysis and modeling by realizing a logical structure associated with an application. The logical structure can include elements such as components, roles, external dependencies, data, and so on. These elements can be extracted from the logical structure of the application. The elements of an application form the basis for threat analysis and modeling. The process by which the one or more elements can be extracted can interchangeably be referred to as application decomposition.

During application decomposition, the application can be broken down into the one or more elements, such as components, roles, external dependencies and data that make up basic building blocks of the application. The components of an application are the basic entities of an application and can include, for example, websites, processing servers, administrator client and so on. The role elements can include, for example "administrator", "particular users", "all users", etc.

External dependencies can be other applications linked to a particular application over which, the particular application has no control. Therefore, functionalities of the other applications can be implemented through these external dependencies. However, some dependencies may result in the execution of an improper code, which may threaten the integrity, or the normal functioning of the particular application. Data elements include the type of data handled by the application. For example, the data elements can include credit card data, user profile, social security number data and so on.

Once an application has been decomposed and the elements of the application have been identified, various attributes corresponding to each identified element are defined. The attributes describe characteristics of the elements, such as how the elements can be accessed, how the elements interact with each other, etc. One or more of the possible threats to a given application are identified based on the defined attributes of the elements. In one implementation, the threats can be identified based on previously experienced or monitored threat conditions. The identified threats are then analyzed and attacks that can be used to realize these threats are identified. For example, a high profile web server application can identify a non-availability threat, and the attack that can be used to realize this type of threat can be a distributed denial of service attack (DDoS). One or more of the attacks can be identified from a collection of possible attacks stored in a common task list.

The common task list includes extensible, customizable collections of previously known attacks that can be contextualized to the application. The CTL describes relationships between attacks, the vulnerability of the application to the attacks, and countermeasures for the vulnerability. The CTL also includes a control library. The control library contains one or more controls that ensure regulation, policies, and standards of an organization are implemented in the application development.

The identified attacks can be classified to prioritize and quantify the associated risks and effective countermeasures can be proposed in a threat model. In an implementation, various visualizations can be generated for enabling an individual (e.g., software author or developer), to implement threat analysis and modeling. Such visualizations, or action items, can present the threat model, including various reports or information, such as analytics, graphics, and visualization that give systematic instructions to implement the proposed actions (e.g., countermeasures).

Threat analysis and modeling may thus be implemented to provide a threat model having extensible and easily manageable information related to an application. Threat analysis and modeling along with associated risk management can be integrated within a typical software development life cycle or SDLC. Incorporation of the security policies into the SDLC improves operational efficiency.

Described here is a threat analysis and modeling technique that also analyzes and compares across an aggregate of threat models within an enterprise for customized reporting.

Exemplary Architecture for Threat Analysis and Modeling

FIG. 1 illustrates an exemplary architecture for realizing a threat model to implement threat analysis and modeling. The threat analysis and modeling (TAM) system 100 includes a Threat Analysis and Modeling (TAM) repository 102 accessible by one or more TAM client computing devices 110 and/or a TAM enterprise control panel (ECP) 112 through a network 108. The TAM repository 102 acts as a backend system and includes a TAM web server 104 and a TAM database 106.

The architecture 100 can include any number of the TAM client computing devices 110. For example, the system 100 can be the World Wide Web, including numerous PCs, servers, and other computing devices spread throughout the world. Alternatively, in another possible implementation, the system 100 can include a LAN/WAN with a limited number of PCs.

The TAM database 106, TAM web server 104 and the TAM client computing devices 110 can communicate with each other through the network 108 using one or more protocols, such as a transmission control protocol running over an internet protocol (TCP/IP). The TAM client computing devices 110 can be coupled to each other or to the TAM repository 102 in various combinations through a wired and/or wireless network, including a LAN, WAN, or any other networking technology known in the art.

The TAM web server 104 is capable of functioning as an interface for the TAM client 108 and the TAM ECP 112. The TAM repository 102 can also expose an application plug-in module interface allowing interfacing with external applications.

The TAM client computing devices (TAM clients) 110 interact with the TAM web server 104 for realizing one or more threat models that speculate as to the various threats to an application. The TAM web server 104 analyzes the threat models that can be defined by one or more of the TAM client 110 or can be pre-specified as a part of a default threat definition.

Users of the TAM clients 110 can identify the application for which a threat model has to be realized. Once the application has been identified, the TAM clients 110 perform application decomposition. During application decomposition, the TAM clients 110 request the users to identify the logical structure of the application and gather one or more of the application's elements that contribute to the logical structure. The logical structure can include elements such as component, roles, data, and application.

The TAM client 110 can then generate the threat model based on the gathered information. In one implementation, the TAM client 110 can download the CTL and the analysis rules at load time or when the TAM client 110 first interacts with the TAM web server 104. The TAM client 110 also receives management information and administrative functions from the TAM ECP 112. The TAM client 110 can then analyze and model the application to generate countermeasures against the vulnerabilities of the application.

In another implementation, the gathered information associated with one or more of the applications are communicated to the TAM web server 104, where it is analyzed based on the CTL stored in the TAM repository 102 along with management information and administrative functions from the TAM ECP 112. The TAM web server 104 provides one or more countermeasures to fix the vulnerabilities in the application.

In an implementation, the TAM ECP 112 can be a web site that can manage the entire threat analysis system including authorization model and other administration functions. Data analysis functionality including reporting and threat model queries along with threat model workflow can also be managed through the TAM ECP 112.

For generating the threat model, the TAM client 110 can implement a threat-analyzing module 114. The threat-analyzing module 114 can realize the threat model for an application and generate visual content, in the form of reports and charts. Such information may provide measures to protect the application against attacks. The threat-analyzing module 114 can receive input data from users on the TAM client 110, and generates an application task list or ATL that includes countermeasures to protect the application from known attacks. The ATL is generated from the CTL. The ATL includes a list of vulnerabilities, attacks, and countermeasures pertaining to a particular application. The ATL can be different for different applications. The ATL may depend on the attributes of the application.

The threat-analyzing module 114 requests the user to input one or more parameters that relate to an application for which the threat model is to be realized. Examples of such parameters include, but are not limited to application structure, objectives associated with the application, functionality, and so on. Based on this user information, the threat-analyzing module 114 generates a threat model that can deploy and centrally manage custom attributes for threat model elements with extensible values. The extensible values may be used to classify threat models.

In another implementation, the threat-analyzing module 114 can also implement suitable corrective actions to counter the identified vulnerabilities based on a set of rules associated with the application, which can enforce the user to implement the recommended countermeasures.

The threat-analyzing module 114 can allow organizations to deploy and centrally manage the CTL, which can be transformed into an attack library for backwards compatibility. The CTL can also help manage the relationship between common SDLC control task lists and policy, standards, and regulations of the enterprise.

Governing security groups can capture and deploy rules to automatically map the requirements of policy, standards, and regulations to contextualized applications through information collected in the threat models. With an integrated workflow, the threat model information can be directly tied to the activities of an application risk management process for improved operational efficiency.

An Exemplary System

Figure 2:
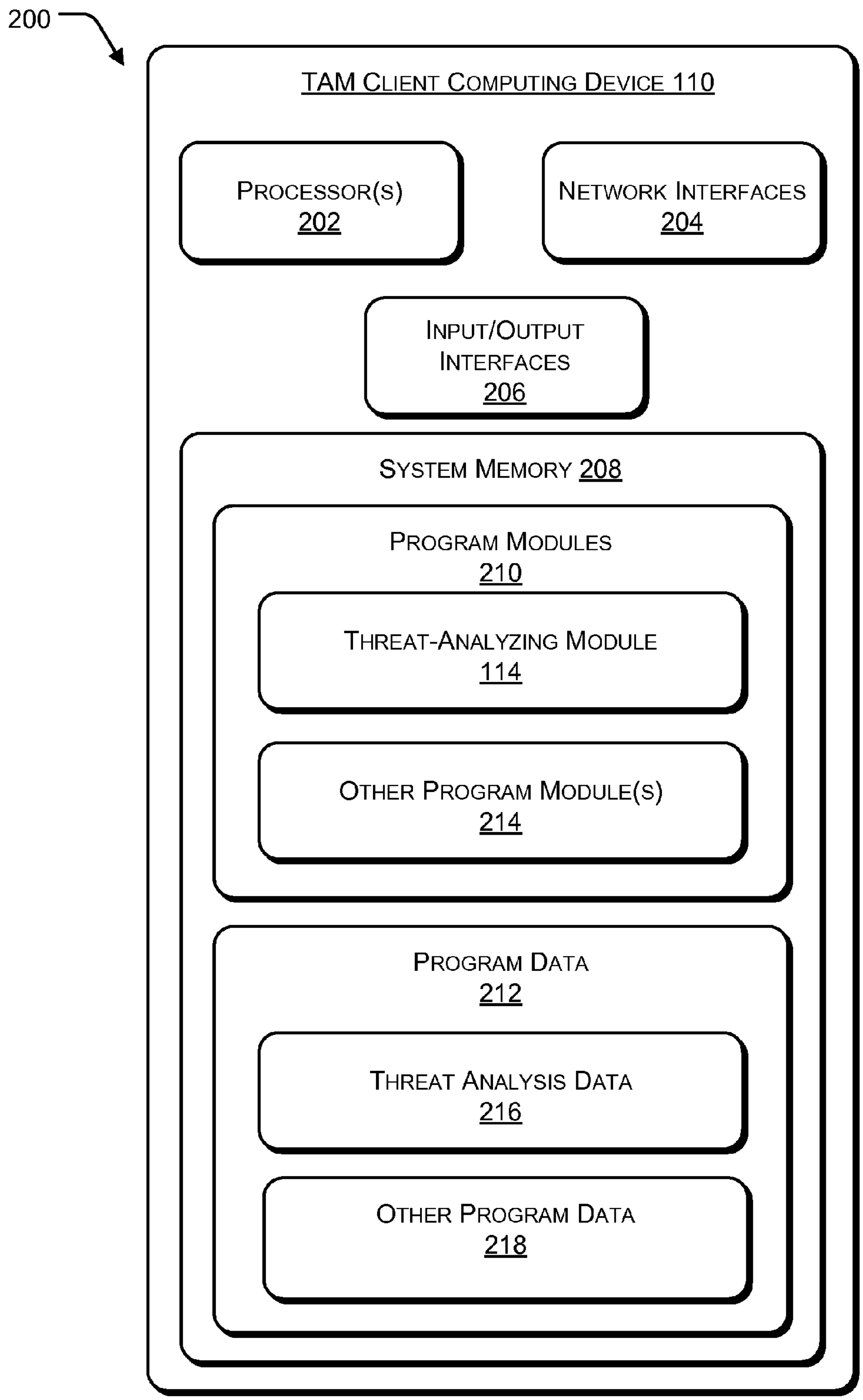
FIG. 2 illustrates an exemplary computing system that implements threat analysis and modeling software used to design security into an application.

FIG. 2 illustrates an exemplary TAM client 110 implementing a threat model for threat analysis and modeling in order to develop secure applications. The TAM client 110 may be implemented as one of the nodes in a website, an organizational intranet, or other network such as a local area network or as a separate computer not included as one of the nodes. The TAM client 110 has one or more processors 202, network interface(s) 204 and input/output interface(s) 206.

The processor(s) 202 can be a single processing unit or a number of units, all of which could include multiple computing units. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 can be configured to fetch, and execute computer-readable instructions stored in the memory 208.

The network interface(s) 204 facilitates communication between the devices across a network, say network 108. Furthermore, the network interface(s) 204 may include one or more ports for connecting a number of computing devices to the each other or to a server-computing device. The network interface(s) 204 can facilitate communications within a wide variety of networks and protocol types, including wired networks (e.g., LAN, cable, etc.) and wireless networks (e.g., WLAN, cellular, satellite, etc.).

I/O interfaces 206 provide input-output capabilities for the TAM client 110. The I/O interfaces 206 can include one or more ports for connecting a number of input devices such as keyboard, mouse and so on and a number of the output devices such as monitor, speakers, and so on. In one implementation, the TAM client 110 receives input data from a user such as application component description via the keyboard or mouse connected through I/O interfaces 206.

The memory 208 can include any computer-readable medium known in the art including, for example, volatile memory (e.g., RAM) and/or non-volatile memory (e.g., flash, etc.). The memory 208 stores program instructions that can be executed by the processor(s) 202.

The memory 208 includes program modules 210 and program data 212. Program modules 210 include for example, the threat-analyzing module 114 and other module(s) 214. The program data 212 includes threat analysis data 216 and other data 218. The other data 218 stores data that may be generated or required during the functioning of the TAM client 110.

The threat-analyzing module 114 allows a developer to design security and risk management into an application by defining the application and its components, identifying risks and possible attacks, and providing countermeasures to prevent all the possible attacks on the application.

The threat-analyzing module 114 can accept various parametric values from the user via the input/output interfaces 206. The parametric values define one or more elements of the application under construction that can be associated with various threat models. The elements of an application can be associated with attributes. The attributes can include application attributes, role attributes, component attributes, and data attributes. The user can define these elements and their associated attributes through one or more parametric values in relation to the application, for which the threat analysis model is to be implemented. Therefore, a combination of parametric values can be indicative of a specific kind of threat.

The application attributes for the application can include information regarding the platform the application will be available on, whether the application can be internal facing or external facing, etc. The component attributes can include information regarding the type of apparatus in the application, the technology used, etc. For example, in a web application, the components can be website, order processing components, reports component, main database, log database, etc.

The user can also define the data attributes of the application. For example, the data can be Personally Identifiable Information (PII) such as social security numbers, and so on or the data can be high impact information such as the confidential financial details of an enterprise.

Furthermore, one or more of the role attributes of the applications can be defined. The roles assigned can be further broken down based on trust levels associated with the application. Examples of the roles in the application can include, but are not limited to administrators, support users, managers, employees, etc. A user can also define an authentication or an authorization process for each of the roles defined for the application. The information collected from a user regarding the application can be stored in the threat analysis data 216.

The threat-analyzing module 114 can utilize the attribute information provided by a user for the elements of the application for aggregate analysis. Typically, in enterprises, different organizational departments can have their own application management systems. The aggregate analysis can be performed on all the departmental applications to determine the security measures to be adopted, the level of security maintained for each department, drawbacks of certain proposed countermeasures if any, and so on. In this manner, the enterprise can assess risk across a number of applications. For example, if security personnel of an enterprise desire to analyze applications that handle PII, are externally facing, and are web applications; the threat-analyzing module 114 can provide a list of all the applications that adhere to the attribute information provided by the user, and perform an aggregate analysis for individual threat models simultaneously.

The threat-analyzing module 114 can request the user to supply information to generate an ATL. The threat-analyzing module 114 can generate the ATL based on the information provided by the user and the CTL stored in the TAM database 106 or downloaded onto the TAM client 110.

The ATL can include countermeasures for defending an application and one or more set of control rules enabling the application to become compliant with industry or technical standards, policies, and/or regulations set by the enterprise or regulation bodies. The ATL can be different for different applications, since the ATL depends on the attributes of the application.

The ATL may be an expandable list that can include one or more standards defined by an individual, such as a system administrator. For example, if an enterprise has a Line of Business (LOB) application standard, then the task items in the CTL could include input validation, exception handling, and so on. The structure of the CTL is further discussed below, in reference with FIG. 3.

The CTL is a knowledge base containing possible guidelines against known attacks, and may be stored in the TAM database 106 or downloaded onto the TAM client 110 initially. The ATL for an application is derived from the CTL. The threat-analyzing module 114 based on the ATL, can advise a user how to implement a particular task item or countermeasure. Furthermore, the threat-analyzing module 114 can advise the user in which circumstances to use a particular countermeasure and advise the user about the reasons for selecting a particular countermeasure for a particular possible attack.

The threat-analyzing module 114 can apply rules to the applications depending on the attributes defined by the user and stored in the threat analysis data 218. Depending on the attributes pertaining to the application, the threat model can set internal policies that enforce these rules on the application once the threat model is created by the threat-analyzing module 114.

For example, in a case where an application dealing with credit card information, the data attribute defined could be personally identifiable information (PII). Application developers, while developing the application, have to reduce the risk associated with the potential confidentiality compromise of the credit cards. Therefore, the threat model enforces a rule mandating data encryption requirements and so on. This can be automated, where one or more rules can automatically be implemented on the application. Rules are defined and described in detail below. Furthermore, the threat-analyzing module 114 can include a user interface that can present pictorial icons for display on the output device.

Common Task List Structure

Organizations typically follow a hierarchy that translates policies into actual tasks. These policies may be implemented by an organization's information technology (IT) department. The hierarchy generally followed may regulations, corporate policies, standards, and action items.

As an example, the regulations can be decided and set by external regulatory bodies. Examples of regulations can be Sarbanes-Oxley (SOX) Act, Payment Card Industry (PCI) regulation, Health Insurance Portability and Accountability Act (HIPAA), and so on. The regulations can then be translated into policies implemented by organizations. Examples of policies can be confidentiality and proprietary information policies, information security policies, and privacy policies. These policies may vary for different organizations based on organizational requirements. The policies may be translated into standards, within the organization. Examples of standards within an organization can include, information classification and handling standards, identity management standards, line of business application standards, and so on. Applications may be built to include action items that implement these standards. For example, the action items in applications may include input validation, exception handling, output encoding, and so on.

The standards and the action items may be such that the issues they tend to address are separated. The CTL combines both the standards and the action items. The action items are defined such that they are pertinent to the threat they are supposed to address or counter. Furthermore, such action items should comply with one or more defined standards.

Figure 3:
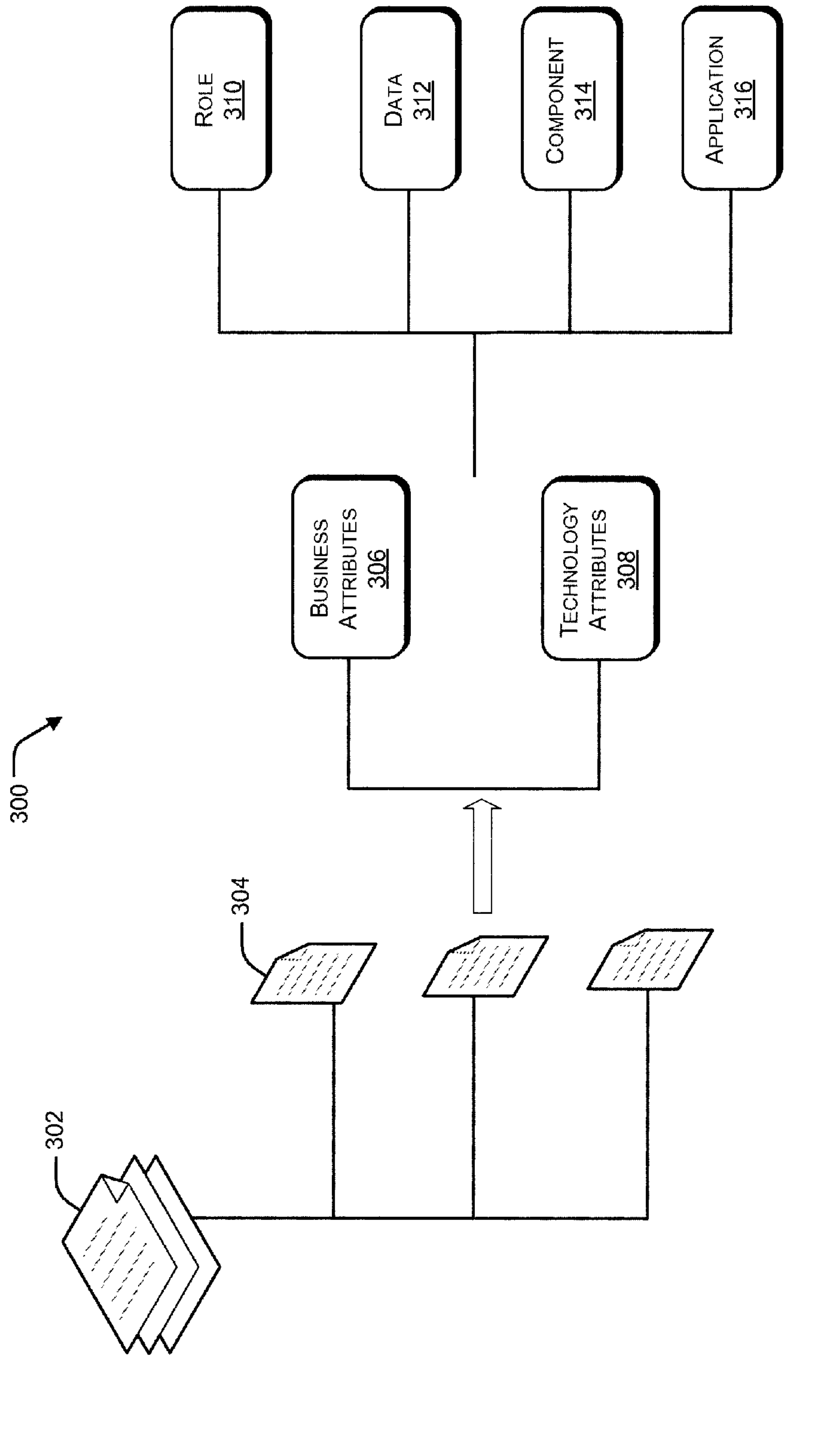
FIG. 3 illustrates exemplary attribute mapping for implementing a common task list to design a threat model implementing threat analysis and modeling.

FIG. 3 illustrates attribute-mapping 300, in a CTL 302. The common task list or CTL 302 includes of one or more task items 304 that are associated with attributes. The attributes can be of two types namely business attributes 306, and technology attributes 308. The attributes can be further classified under role 310, data 312, application 314, and component 316.

The CTL 302 includes an attack library and a control library. The attack library can contain information pertaining to the technology attributes 308, their vulnerabilities, and the countermeasures to fix the vulnerabilities. For example, the attack task list of the CTL 302 can have the following structure.

```
<Applicability attributes> (extensible)
    <Type>
     [design, code, infrastructure, operational]
     <category>
      {Code}→ [Input Val, Parameter Man, Session Mgmt]
      {Infra} → [Patches, Files, Shares ...]
          (obtained from Patterns & Guidance)
    <Technology>
     [ASP.NET, SQL Server 2005, Windows Vista, ...]
    <Entry>
     [Details/Description]
     [IVM Matrix]
      [Implement]
      [Verify]
      [Monitor]
     [Possible attack mitigated]
    <Reference>
     <control UID(s)>
```

In the above representation, applicability attributes can be represented as technology attributes namely role 310, data 312, application 314 and component 316. The type of application can also be defined, where the type of application field may include the design of the application, the code used, the infrastructure involved such as patches, files and shared files, and the operation of the application. Technology used may also be defined from a list of technologies available. In some cases, if the technology used does not exist in the model, the user can define the new technology. One or more fields may indicate possible attacks and countermeasures available to address or counter an identified threat. Instructions may give to implement the countermeasures; and verify and monitor the countermeasures.

The control library can include information pertaining to the standards, regulations, and policies of an enterprise. The control library can also define the parties involved in the application threat model and can determine the priority of task items. An exemplary structure for control library is as follows:

```
<applicability attributes> (extensible)
  <data attributes>
  <role attributes>
  ...
<category>
  [Authentication, Authorization, Auditing, Logging, ...]
<Entry>
  [Details]
    [Name]
    [Unique identifier - UID]
    [Actual text entry]
  [RAAI Matrix]
    [Responsible]  {   } (doer/implementer}
    [Accountable] {    } (business/risk owner}
    [Auditor] { } (security/auditor analyst)
    [Informed] {   } (Exec business owner)
<priority>
  [Control priority - selection]
<reference>
  [Policy section, Regulation section]
```

In the above example, the applicability attributes define the attributes of an application, i.e. role 310, application 312, data 314, and components 316. The category as it appears in the above control list, refers to the type of security that may be required and can include authentication, authorization, auditing, logging etc. The entry field is the details pertaining to attacks and countermeasures. The entry field can include the name of the threat or countermeasure, a unique identification number and a brief textual description regarding the attack or the countermeasure.

The control list library can provide information regarding the different people/users involved in the threat model. For example, the people involved can be individuals responsible for implementing the threat model, where the accountable person that can include an organization owner, an auditor, and an informed party (e.g., executive business owners).

The control list can also specify one or more priorities. The priorities can be either set by a user or automatically based on the threat model realized. These priorities can indicate the possible attacks that require immediate attention or are the most probable. In another implementation, the countermeasures can also be prioritized based on their relevance to the application attributes.

The task items 304 in FIG. 3 include countermeasures for particular attributes. Different task items can exist for different attributes. In one implementation, each of the task items can be characterized by an identification number and can be napped onto the attributes. An exemplary task item template is illustrated as follows:

```
<ACE Area>
    [SEC/PRIV/PERF]
<Task-list Item Identifier>
<Category>
    <sub-category>
<Type>
    [Design/Code/Infrastructure (config)/Operational]
<Technology>
<Title> (Should be less than 5 words)
<Description> (Should be less than 10 words)
<Attributes>
    Role - [Attribute Name] - [Attribute Value]
    Data - [Attribute Name] - [Attribute Value]
    Component - [Attribute Name] - [Attribute Value]
    Application - [Attribute Name] - [Attribute Value]
<Where to Implement?>
<How to Implement?>
<Reference>
```

-continued

```
    (URL and CWE mapping)
    <Related Attack/Implication>
    <Contributors>
```

In the above illustration, the ACE Area indicates any one of the possible threat areas, such as security, privacy, performance, and so on. Any one of the areas can be selected that the task list item applies to. The task item identifier is a unique number called the unique task item ID that identifies the task item. Each task item may have its own unique task item ID. The category field allows the user to select a security category from a drop down list; any appropriate category can be selected from the list. For example, the categories can be authentication, authorization, auditing, logging on, and so on. If the category does not exist in a drop down box, the user can enter an appropriate category in the field. In certain cases, some categories can also have sub-category entries from which one or more options can be selected. In the above illustrated task item, other fields can be characterized that would define the various task items that are applicable to a given threat.

Rule Driven Threat Modeling Automation

As indicated, a threat model enables a system user to understand risks that an application may be vulnerable to, prior to the development stage of the application. The threat modeling assists in defining an acceptable assurance level. This acceptable assurance level is then translated into one or more key controls to be implemented for countering the perceived threat. The key controls can be the task items from the CTL. The application during development can be reviewed to ascertain whether the assurance level defined by the developer is acceptable at the enterprise level or not.

The threat model as described can also include one or more defined rules. For example, the threat model can support two types of rules, in particular, threat configuration rules and CTL binding rules. Each of the two rules can be broken up into two part namely, qualifiers and effects. Qualifiers define the applicability of the rule. Effects define the effect or a behavioral change a system may display on the application of the rules. The qualifier for both the threat configuration rules and CTL binding rules can be applied against the attributes, which for each threat, can be obtained by analyzing the attributes associated with each threat. The application attributes can be the same for each threat since they are related to the entire threat model.

It is noted that the threat configuration rule may be different for each threat type, i.e., confidentiality, integrity or availability threat. For different threat types, users can be given options to configure the rules. For example, a user can define a name and a related description for one or more threats. The user can also configure the risk impact field as high, medium or low. A risk probability field can also be configured to "high", "medium" or "low." Other risk related options and parameters can be defined that would be indicative of the risk posed by a threat and the nature of the response to be meted out in view of the perceived risk.

Common configurations for all threat categories can be accompanied by certain primary threat factors that vary for each security threat. For example, for a confidentiality threat in which confidential information related to an individual may be at risk of being disclosed to unauthorized individuals, the user can specify values for properties such as "unauthorized disclosure of the identity" and "unauthorized disclosure of the data" fields. An affirmative for these properties would disallow all unauthorized exposure of the confidential information to outside individuals. In this manner, other types of threats can be controlled or prevented by specifying values to one or more properties associated with these threats.

The CTL binding rule offers task items from the CTL if a qualifier is matched against an attribute of the application. The task item ID is applied to the qualified threat and the CTL task item corresponding to the task item ID can be imported from the CTL.

FIG. 4 is a table 400 that illustrates exemplary rules applied to an application. In particular, table 400 illustrates an exemplary rule to enforce Secure Sockets Layer (SSL) for high impact information data transfer between a website and a web service. The "component attributes" are website 402 and web service 404, while the data attribute is high impact information. The rules enforced on such an application are to use SSL for security of data. This rule is a CTL binding rule and SSL is the task item having ID 57 (SSL) 406. When the rule applies, the task item is automatically bound to the threat and becomes a part of the ATL. The threat configuration rule indicates that for the confidentiality threat, the risk impact can be high and the risk can be reduced by applying countermeasures. Similarly, the integrity threat of the data has medium risk impact, and the risk could be reduced by using some countermeasures. In this example, the countermeasure uses SSL in the communication channel.

In another implementation, privacy requirements can be enforced to preserve the secrecy of information related to applications dealing with PII. In such cases, the PII collected from the users and the application has a CTL binding rule to enforce certain privacy policies on the application.

Integrated Threat Modeling Workflow

A feature of the disclosed threat analysis and modeling is an integrated threat modeling (TM) workflow. The threat modeling workflow may be performed during various stages of a typical software development life cycle. In a part that includes review cycle, implementation is at an application design stage. Another part may be aligned with an application test stage.

Figure 5:
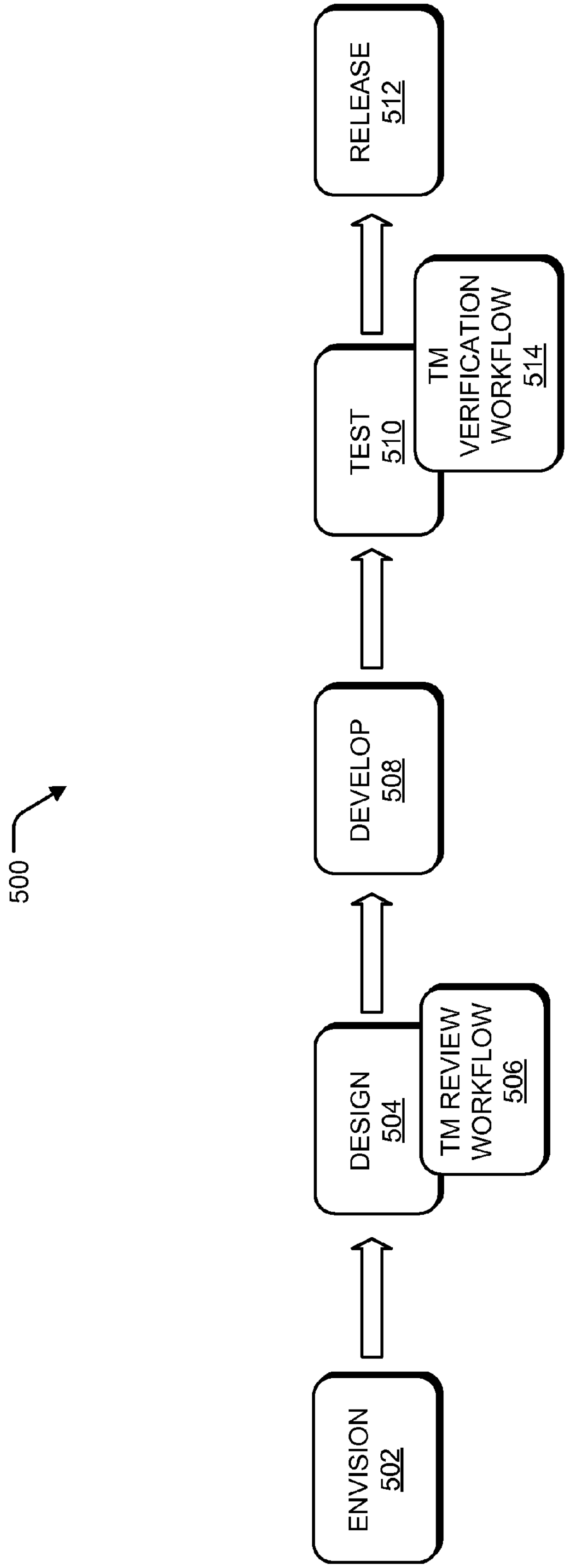
FIG. 5 illustrates exemplary threat modeling workflow integration for implementing threat analysis and modeling.

FIG. 5 illustrates the threat modeling workflow alignment with a typical software development lifecycle (SDLC). Blocks 502 to 510 represent a typical SDLC 500. It can be appreciated that the blocks 502 to 510 in the typical SLDC can be added or removed in other SDLCs. The workflow of the threat analysis and modeling tool can be integrated into any SDLC known in the art that has a design phase and a testing phase.

The first phase of the SDLC can be an envision phase 502. In the envision phase 502, the application can be identified, and the application's main objectives and functionality to be implemented can be discussed. The envision phase 502 may also include outlining one or more standards and policies for the application.

The SDLC 500 includes a design phase 504. In the design phase 504, the basic building blocks of the application can be identified. The threat modeling for the application can be done in this phase of the cycle. For example, the design phase 504 can include various aspects of application development such as defining attributes of the application, deciding the technology to be used, identifying the platform that would host the application and the level of security required for the application. The threat model can be analyzed based on the attributes, objectives, and functionality of the application. At the design phase 504, various threats can be identified. Upon identification of the threats one or more changes can be made to the envision phase 502 and the design phase 504 stage of the SDLC 500. The phases can be repeated until the number of threats is minimized to a desired level. This can be implemented at the TM review workflow 506 stage that is described later.

The SDLC 500 can include a development phase 508. In this phase, code implementing one or more functionalities identified in the envision phase 502 and design phase 504 is generated. Code development is performed keeping in mind various threats the application may be subjected to and incorporating within the code, instructions for countering the threats. The countermeasures can be implemented in accordance with the threat model generated in the design phase 504.

Once the application is developed, the application can undergo a test phase 510 phase. The application can be internally tested for various possible cases. The application is tested for its functionality and security. Possible attacks can be applied to the application to test the vulnerability of the application under attack. During the test phase 510, various speculated threats are ascertained. In some cases, some the application may be subjected to a new type of threat that had escaped (i.e., not identified) the threat modeling of the application.

After the internal testing has been completed, the software application reaches the final or release phase 512 of the SDLC 500. The released application can be constantly monitored to make sure it meets the desired security assurance level and operates in accordance to its functionality and objectives.

As indicated previously, TM review workflow 506 may be applied in parallel with the design phase 504. The TM review workflow 506 can be used to review and obtain a confirmation on the threat model. The TM review workflow 506 includes reviewing the application task list (ATL) that can be used for defining one or more task items that will be implemented as a part of the application development for managing the identified risks. An exemplary workflow method is described below with reference to FIG. 7.

A threat modeling (TM) verification workflow 514 is used to verify the results of the comprehensive security assessment of the application against the threat model in the test phase 510. The threat modeling verification workflow 514 can be used to verify whether all the task items identified as part of the threat modeling process implemented correctly during the develop phase 508 of the application. If not, then a regression may have to be performed to outline various ATL task items to be implemented, to correctly ascertain various threats the application may be prone to.

Exemplary Method(s)

Figure 6:
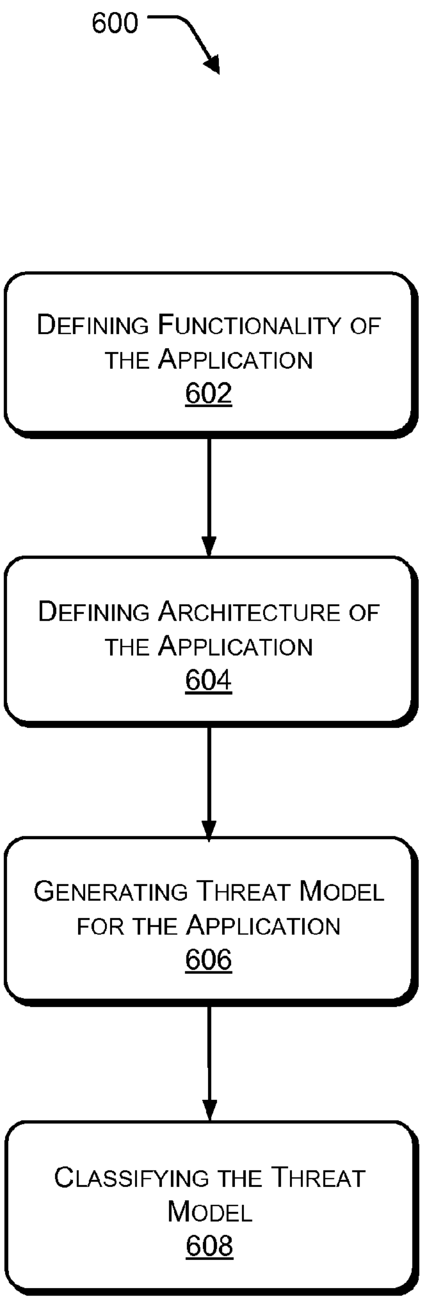
FIG. 6 illustrates exemplary method(s) for implementing a threat model used for threat analysis and modeling.

FIG. 6 illustrates an exemplary method 600 for implementing the disclosed threat model used for threat analysis and modeling. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 602, a user of a TAM client 110 can define an application to be analyzed and modeled. The user can define the application and provide information associated with the application to be stored as threat analysis data 216. The information as collected in the threat analysis data 216 is indicative of the objectives and functionality of the application. In an implementation, the application design can be identified. Furthermore, a risk assessment can be carried out on the application to determine the desired assurance level required for the application depending on the type of data handled by the application, such as PII, and so on.

At block 604, the architecture of the application can be defined. At this stage, the design or the logical structure on which the application is based is determined. In one implementation, the user can determine the logical structure associated with the application. The structural blocks of the application include, but are not limited to website, web-service, and order-processing module and so on. The threat-analyzing module 114 can determine attributes and the rules relating to the application. The rules can be based on the attributes of the application, and other factors such as the technology used, the coding language to be used, the platform the application is going to be hosted on and so on.

At block 606, the threat model can be generated. In an embodiment, generation of the threat model includes generation of an ATL. The ATL can be generated by selecting task items from the CTL that pertain to the application being modeled. The CTL and related information can be stored in the TAM database 106 and the CTL can be downloaded at the TAM client device 110 from the TAM database 106. The threat-analyzing module 114 retrieves application related information from the threat analysis data 216 and the CTL for generating the ATL. The ATL pertains to the application whose threat model is being designed. The ATL includes task items to be implemented in the application for making the application secure against known probable attacks. The known probable attacks can be listed in accordance with attributes and rules of the application and countermeasures against the known attacks can be listed in the ATL's task items.

At block 608, the threat model generated at block 506 can be classified. For example, the threat-analyzing module 114 can set priorities for the task items that need to be implemented depending on the vulnerabilities of the application they are meant to fix. The user can select priorities from a list containing priority values high, medium and low. Once the threat model is generated and classified, the threat model can be used to develop the application and implement the task items stated in the threat model to create a secure application.

Figure 7:
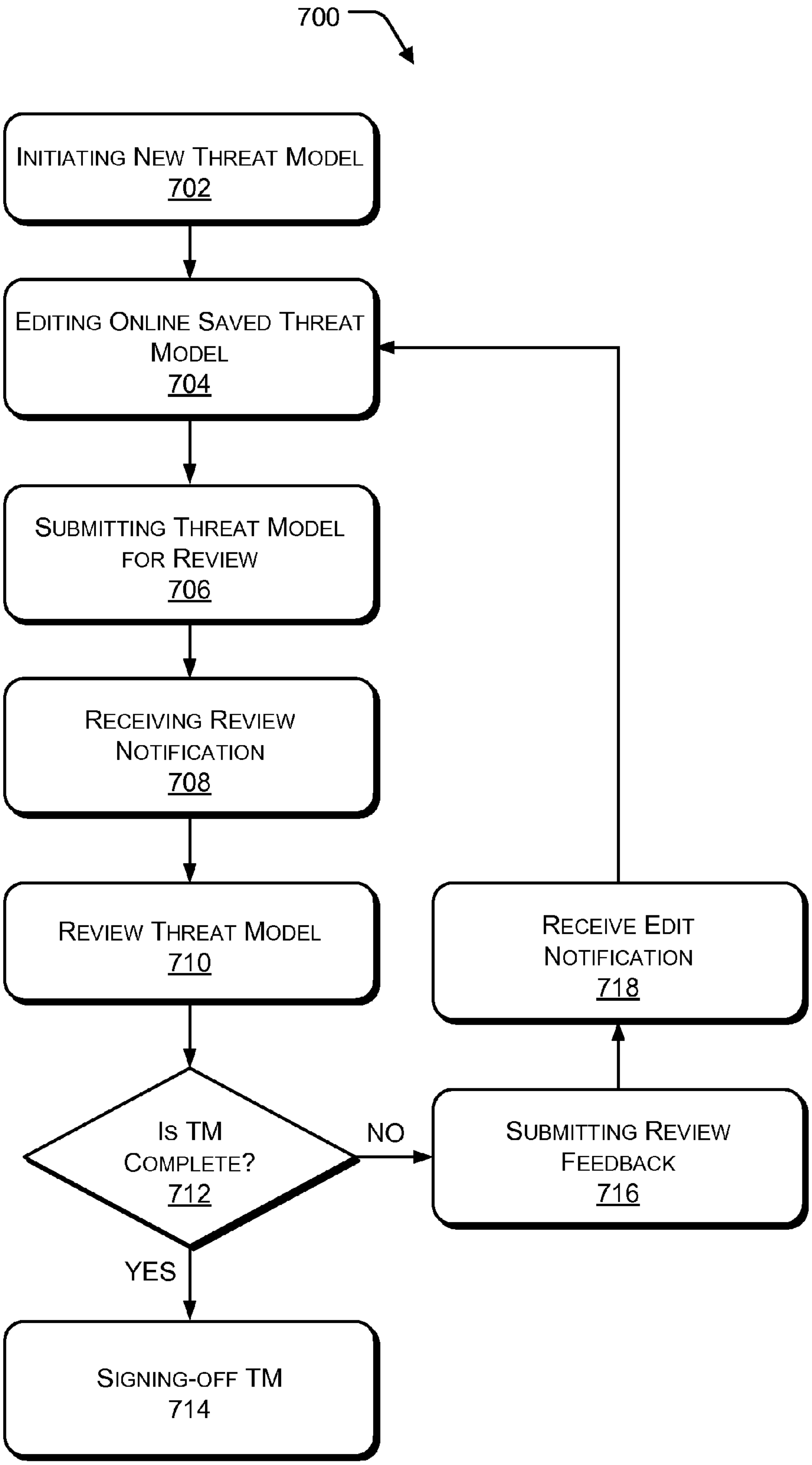
FIG. 7 illustrates exemplary method(s) for implementing a threat modeling review workflow.

FIG. 7 illustrates an exemplary method 700 for implementing the threat modeling (TM) review workflow 506. The TM review workflow 506 may be performed along with the design phase 504 stage. The order in which the method is described, is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof without departing from the scope of the invention.

At block 702, a new threat model is initiated. The new threat model can be initiated automatically online on the TAM web server 104. In another implementation, the threat model can be initiated by the threat-analyzing module 114 at the TAM client device 110. An author or developer may initiate work on a new threat model for an application. The initiated threat model can be stored on an external storage medium that can be accessible through a wired or wireless network, such as the Internet. The threat model can be stored in the TAM repository 102.

At block 704, the saved threat model can be edited. The author or developer can choose to save the threat model on-line in the TAM repository 102, so that the other parties can access the threat model. As part of the modeling, the author can also have the ability to view the current application task list or ATL that shows one or more of the task items to be implemented as part of the application develop phase 508. With each task item, the author has the ability to select responses such as "implement", "file exception", and "not applicable."

The "implement" response selected by the author can indicate that the application team commits to incorporate the task item into the application and implement the task item during the develop phase 508 phase. The "file exception" response indicates an exception for the task item. The reason for choosing this option can vary anywhere from technical infeasibility to resource constraint. The "not applicable" response indicates that the current task item is not applicable in the context of the application. The threat model in the TAM repository 102 can also be set to an "In Edit" state.

At block 706, the threat model can be submitted for review. The author or developer can chose to have the threat model reviewed. In an implementation, the threat model can automatically be sent for review. At this stage, the threat model's state can be set to "Awaiting Review."

At block 708, a notification is sent to the appropriate reviewers indicating a review is required for a threat model. In one implementation, this review notification can be sent automatically by the threat-analyzing module 114 once the state of the threat model is set to "awaiting review". In another implementation, the author has to manually send a review notification mail to the reviewer.

At block 710, the threat model is retrieved and reviewed. The reviewers review the application task list ATL and the responses within the ATL for each task item. The reviewing can be performed based on information included in the ATL.

At block 712, after the threat model has been reviewed, a decision can be made whether or not the threat model can be considered complete. If the threat model is considered complete (i.e., following the YES path from block 712), at block 714, the threat model can be submitted. The threat-analyzing module 114 can send a notification to the authors stating no more action is required. Alternatively, if the threat model is not complete (i.e., following the NO path from block 712), at block 716 the reviewed threat model can be returned with feedback comments to the authors (developers). At block 716, any feedbacks or inputs received during the reviewing process forms a part of an edit notification.

At block 718, an edit notification email can be sent to the application team indicating that the threat model has been reviewed and that the reviewer has provided a feedback. The authors may take some actions and edit the threat model. The edit information acts as inputs for further editing of the saved threat models. Such information provides insights into the areas within the application where further security is required to counter related threats. The process 700 then repeats from block 704 until the threat model is considered complete and the reviewers sign off on the threat model.

Figure 8:
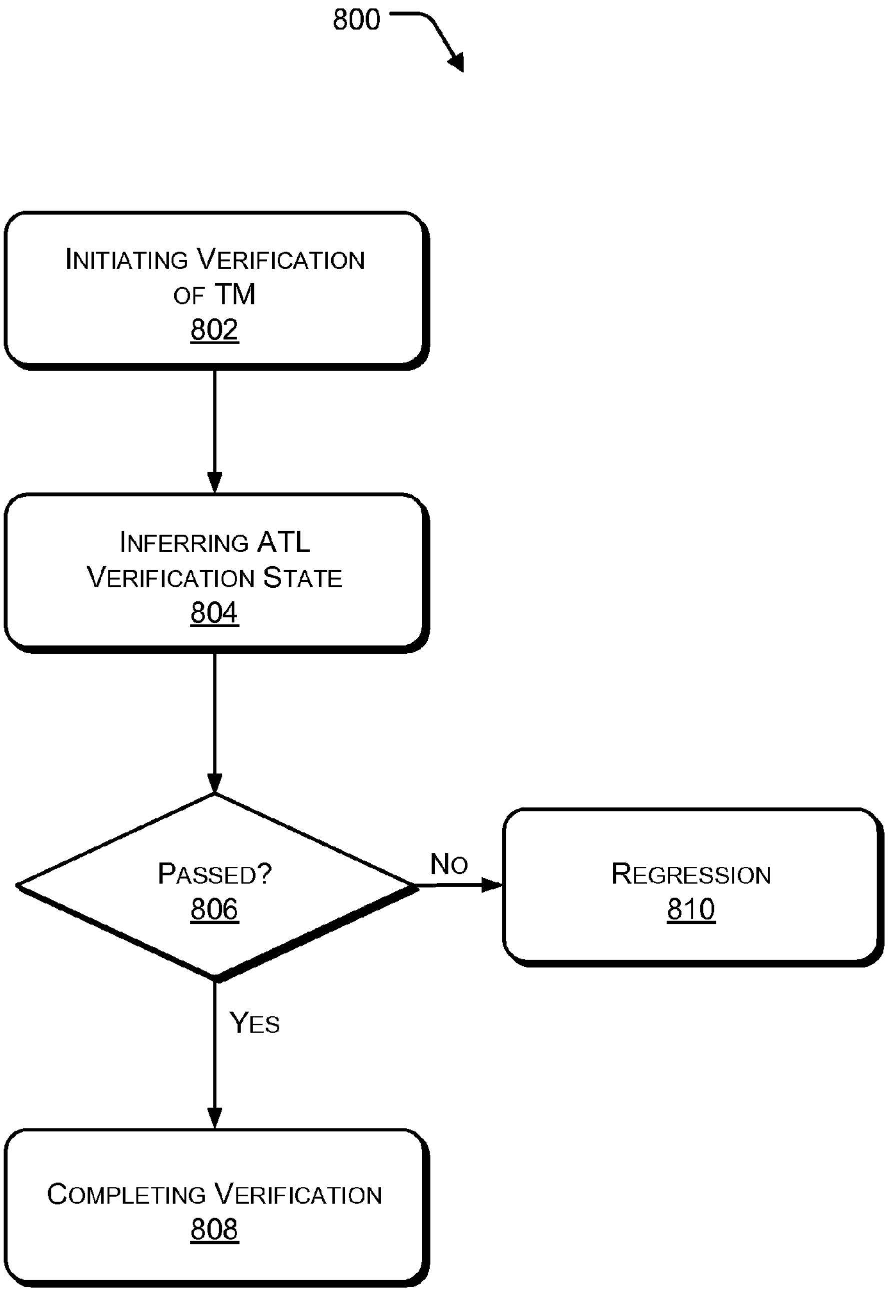
FIG. 8 illustrates exemplary method(s) for implementing a threat modeling verification workflow.

FIG. 8 illustrates an exemplary method 800 for implementing a threat modeling (TM) verification workflow 514. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 802, the verification of the threat model can be initiated. The threat model can be retrieved from the TAM repository 102. Once the application is developed at the develop phase 508, the application can undergo extensive tests, at this phase the threat model is verified to ensure the threat model has been successful in implementing the recommended countermeasures.

At block 804, the verification state of an application task list is inferred. Any unsuccessful implementation of the task items listed in an ATL can result in bugs being present in the application. The TAM repository 102 can execute an automated process to analyze the bugs against the application and infer their association with the task items in the ATL. For all mapped task items that have bugs, the verification status can be set to "failed". The process of verifying the correct implementation of identified task items can be derived by analyzing the bugs. Any suitable software known in the art that performs code failure analysis can be used to analyze the bugs. In another implementation, the verification can be done manually.

At block 806, the threat-analyzing module 114 can determine whether the threat model verification has passed. The determination is made based on the ATL. If at least one task item is marked as "failed", the threat model verification also fails. Conversely, in the absence of any "failed" task items, the threat verification passes.

If the threat model verification passes (i.e., following the YES path from block 806), at block 808 the threat model verification can be completed. Alternatively, if the threat model verification has not passed (i.e., following the NO path from block 806), at block 810 a regression process can be initiated for the application. The regression process can include repeating the design phase 504 for the application. The various factors that taken into consideration may be revisited to provide a better threat model that is better related to the application's functionality and desired objectives. In particular implementations, the regression process may begin from envision phase 502.

At block 808, the verification is complete, and the threat model document's state can be set to "closed." In an implementation, a passed verification notification can be sent to the members of an application team(s), notifying them that the threat model verification has been completed and no further action is needed. For example, an email notification can be automatically sent by the threat-analyzing module 114, once the threat models status is set to "closed" or the reviewer can manually send the email notification to the application team(s).

Exemplary Computing Environment

Figure 9:
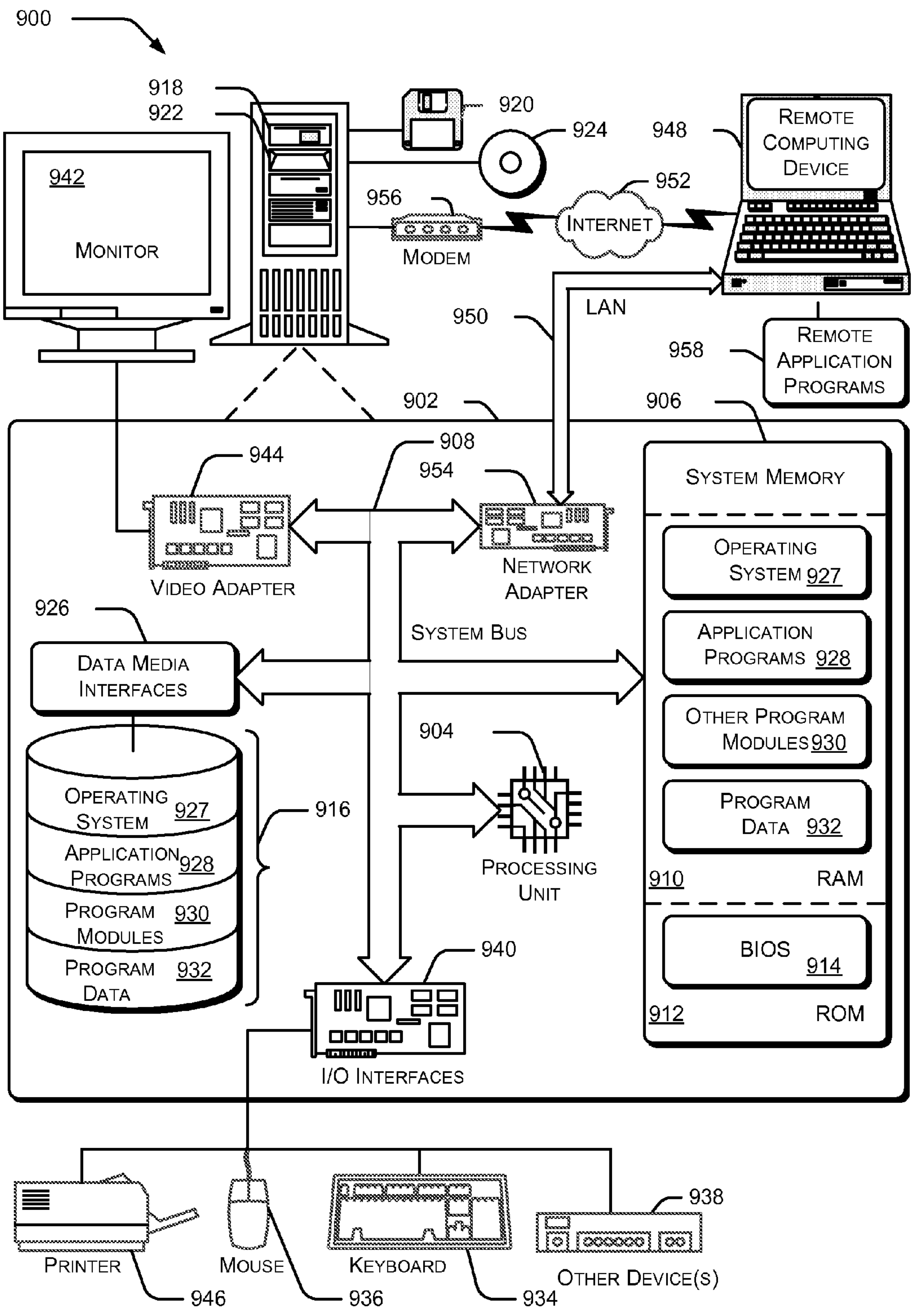
FIG. 9 illustrates an exemplary computing environment on which an exemplary threat analysis and modeling computer of FIG. 2 may be implemented.

FIG. 9 illustrates an exemplary general computer environment 900, which can be used to implement the techniques described herein, and which may be representative, in whole or in part, of elements described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

Computer environment 900 includes a general-purpose computing-based device in the form of a computer 902. Computer 902 can be, for example, a desktop computer, a handheld computer, a notebook or laptop computer, a server computer, a game console, and so on. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912 is illustrated. RAM 910 typically contains data and/or program modules that are immediately accessible to and/or presently operated on by the processing unit 904.

Computer 902 may also include other removable/non-removable, volatile/non-volatile computer storage media. By way of example, FIG. 6 illustrates a hard disk drive 916 for reading from and writing to a non-removable, non-volatile magnetic media (not shown). furthermore FIG. 6 illustrates a magnetic disk drive 918 for reading from and writing to a removable, non-volatile magnetic disk 920 (e.g., a "floppy disk"), additionally FIG. 6 illustrates an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternately, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may implement all or part of the resident components that support the distributed file system.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946, which can be connected to computer 902 via the input/output interfaces 940.

Computer 902 can operate in a networked environment using logical connections to one or more remote computers, such as a remote computing-based device 948. By way of example, the remote computing-based device 948 can be a personal computer, portable computer, a server, a router, a network computer, a peer device or other common network node, and the like. The remote computing-based device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing-based device 902, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing enterprise threat analysis and modeling have been described in language specific to structural features and/or methods, it is to be understood that the subject of the appended claims is not necessarily limited to the specific features or methods described. Rather, the specific features and methods are disclosed as exemplary implementations for the enterprise threat analysis and modeling.

What is claimed is:

1. A method performed by a computing device comprising a processor and a memory, the memory including instructions executable by the processor, the method comprising:

within a software development lifecycle, decomposing a software application into elements comprising components, roles, external dependencies, and data;

identifying attributes corresponding to each of the elements;

identifying one or more threats to the software application based on the attributes;

identifying attacks to the software application from a common task list based on the one or more threats, the common task list including a collection of previously known attacks;

determining risks associated with the attacks to the software application;

generating an application task list that includes countermeasures to protect the software application from the risks;

developing code of the software application based on the application task list; and generating a visualization to enable a software developer to implement the countermeasures during the software development lifecycle.

2. The method of claim 1, wherein the application task list includes rules to enable the software application to comply with one or more standards or policies.

3. The method of claim 1, wherein the components comprise at least one of a website, a processing server, and an administrative client.

4. The method of claim 1, wherein the external dependencies describe how to access the elements and how each of the elements interacts with other elements.

5. The method of claim 1, further comprising analyzing the one or more threats after identifying the one or more threats.

6. The method of claim 1 wherein the visualization includes instructions to the software developer to implement the countermeasures.

7. The method of claim 1, further comprising testing the software application to determine a functionality of the software application and to determine a security assessment of the software application against the attacks.

8. The method of claim 7, wherein the testing includes a threat model verification workflow to verify the security assessment of the software application against the threat model.

9. A method performed by a computing device comprising a processor and a memory, the memory including instructions executable by the processor, the method comprising:
- defining a software application as part of a software design lifecycle;
- determining attributes relating to the software application;
- identifying rules to enable the software application to comply with one or more standards or policies, the rules identified based on one or more of: the attributes of the software application, a type of technology associated with the software application, a software coding language used to implement the software application, and a platform of the software application;
- identifying threats to the software application based on the attributes; and
- generating a threat analysis model based on the attributes, the rules, and the threats.

10. The method of claim 9, wherein defining the software application includes performing a risk assessment on the software application.

11. The method of claim 9, wherein generating the threat analysis model comprises generating an application task list.

12. The method of claim 11, wherein the application task list includes one or more of the following: vulnerabilities associated with the software application, potential attacks associated with the vulnerabilities, and countermeasures associated with the attacks.

13. The method of claim 9, further comprising classifying the threat analysis model.

14. A method performed by a computing device comprising a processor and a memory, the memory including instructions executable by the processor, the method comprising:
- initiating creation of a new threat model for a software application during an application development phase of a software development lifecycle;
- identifying rules to enable the software application to comply with one or more standards or policies, the rules identified based on one or more of: attributes of the software application, a type of technology associated with the software application, a software coding language used to implement the software application, and a platform of the software application;
- submitting the new threat model for review;
- receiving feedback of the new threat model; and
- completing creation of the new threat model based on the feedback.

15. The method of claim 14, wherein the new threat model is based on decomposing a particular software application.

16. The method of claim 14, wherein initiating creation of the new threat model is performed by a threat analysis server.

17. The method of claim 14, further comprising verifying the new threat model.

18. The method of claim 14, further comprising receiving additional feedback before completing the creation of the new threat model.

* * * * *